Figure 2:
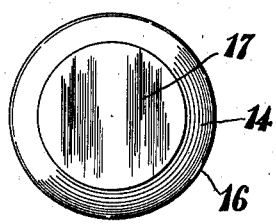

Sept. 24, 1940.   O. HENSELMAN   2,215,701
BEARING ROLLER
Original Filed March 3, 1936

Inventor
Otto Henselman
By Frease and Bishop
Attorney

Patented Sept. 24, 1940

2,215,701

UNITED STATES PATENT OFFICE 2,215,701

BEARING ROLLER

Otto Henselman, Canton, Ohio

Original application March 3, 1936, Serial No. 66,908. Divided and this application August 15, 1938, Serial No. 224,841

3 Claims. (Cl. 308—215)

The invention relates to improvements in roller bearings and more particularly to that type of bearing in which tapered bearing rollers are employed, and the present application is a division of my co-pending application Serial No. 66,908, filed March 3, 1936.

The object of the invention is to provide tapered bearing rollers of balanced form so as to produce a correlation of the elements in a bearing structure which will assure a more efficient operation and greater durability of the bearing as an entirety.

Because of the apparent fact, of higher powered engines, greater speed, and more powerful brakes, also quick starting and stops, the "balanced" tapered rollers produce a greater degree of safety performance, thereby, exceeding the limits of unbalanced rollers, relative to a natural law, i. e. the force of gravity.

Another object is to provide a tapered bearing roller so formed that the roller will be balanced whereby when it is used in a bearing structure it will be retained in true rolling line at all times, whereby friction will be reduced to a minimum.

A further object is to provide a tapered bearing roller so shaped that it will be balanced when in use so as to neutralize wobbling or dancing of the roller.

A still further object is to provide a tapered bearing roller which is properly balanced by forming a substantially conical cavity in the larger or heavier end of the roller.

Another object of the invention is to provide a bearing roller so constructed that a race of such rollers will be both statically and dynamically balanced.

Figure 1:
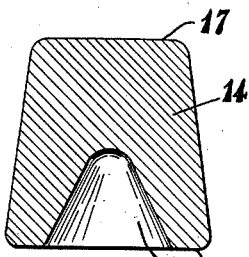
Figure 3:
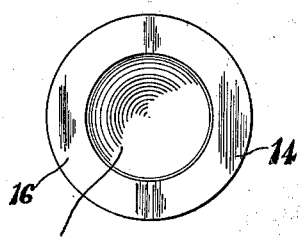
Figure 4:
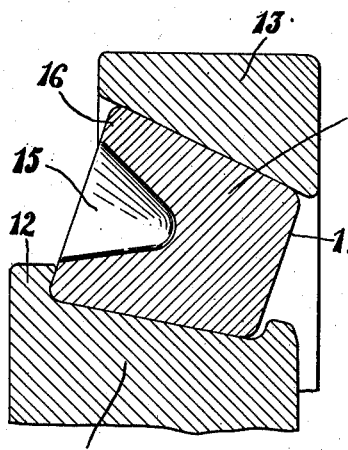
Figure 5:
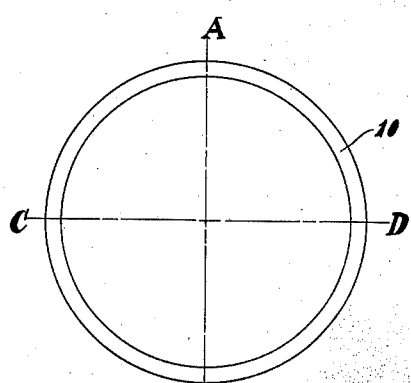
Figure 6:
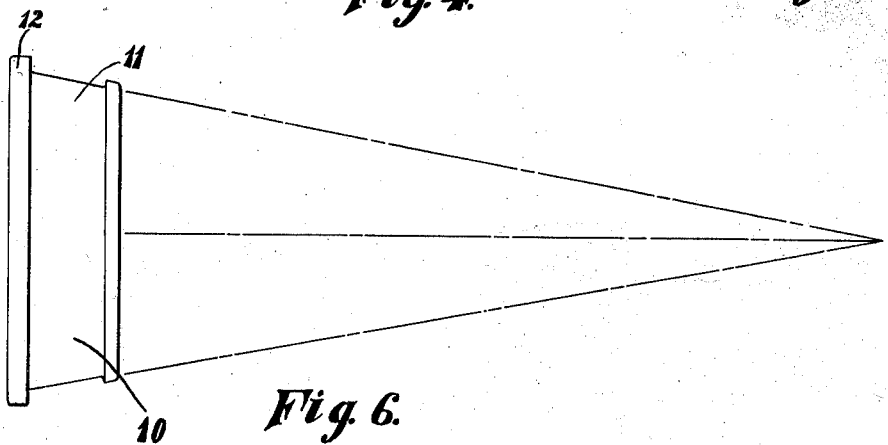

The above objects together with others which will be apparent from the drawing or which may be later referred to may be attained by constructing the improved bearing roller in the manner illustrated in the accompanying drawing in which:

Figure 1 is a longitudinal sectional view through a tapered bearing roller embodying the invention;

Fig. 2, an end view of the roller, looking toward the smaller end thereof;

Fig. 3, an end view of the larger end of the roller;

Fig. 4, a fragmentary sectional view through portions of the cup and cone of a roller bearing showing one of the improved bearing rollers located therebetween;

Fig. 5, a diagrammatic view showing the centrifugalized area in which the tapered rollers operate in a roller bearing; and Fig. 6, a diagrammatic view of the tapered cone upon which the tapered rollers are seated.

Similar numerals refer to similar parts throughout the drawing.

Referring first to Fig. 5 of the drawing, this diagrammatic view is for the purpose of showing at 10 the centrifugalized area in which the tapered bearing rollers operate in a roller bearing.

The vertical center line is indicated at A—B, and the horizontal center line is shown at C—D. Thus, the points A, B, C, and D, are the four cardinal points of the bearing race members in relation to all movements of the bearing.

The discovery of these four points just mentioned as points of event, relative to time, and space, and the law of the force of gravity we are inclined to accept as "true." It follows that a natural object is, to remove the difference of weight found in the large or heavier end of the roller, and thus, both ends of the rollers rolling line become a balanced form of tapered roller. It is necessary here to investigate further the significance of balanced rolls in order to attain the greatest possible clearness. Let us turn to Fig. 6, of the drawing, the cone, and for example for more definite ideas relative to this invention, we call the cone diameter at 12, 10 inches, once and for all in this experiment, we return now to Fig. 5, and the four cardinal points. At A is the exact point where applicant has now placed a roller, it rests there one hundred percent. The distance from the center of the cone or its axis or rotation naturally is five inches to point of roller rest at A. Thus, A becomes a point of event, since it is impossible to locate another point of rest.

This is true because of the force of gravity, so we place the cup in its position, and now that same roller rests one hundred percent at point B, the roller being for example two inches in diameter at its large end, the distance thus, is from the axis of rotation to its resting point, seven inches, because at no other point in the cup area will the roller rest, so point B is a point of event, at C—D the roller is free of the cup and cone. Since these points only indicate the influence of force of gravity one hundred percent and the distance of the axis relative to rotation at C—D is six inches to a point of center of the force of gravity or gravitational space, points of event, the foregoing consideration, relative to the four cardinal points, and the law of force of gravity.

Expressed in an abstract manner we say, one pound of weight was taken out of the heavier end of the roller, because it was that much heavier than its smaller end, of the rolling line, possibly slightly more metal being removed to allow for some lubrication that might lodge in the cavity, as indicated at 15 in Fig. 4, of the drawing.

Assuming that in this bearing there are twenty rollers, one pound equals four pounds, and, twenty pounds equals eighty pounds, it is obvious that twenty rollers, each having one pound removed will indicate twenty pounds statically, relative to their positions and to its axis. But the result, dynamically, is eighty pounds.

As the tapered rollers pass through these four cardinal points there are four different positions of compulsion in the roller race area. It is necessary that this fact be recognized in order to appreciate the significance of the balanced rollers.

Referring to Fig. 6, the tapered cone, upon which the tapered bearing rollers are seated, is indicated generally at 11.

Since the larger end of the roller rolls upon the larger area of the cone, the taper vitally effects the natural laws of force and gravity as well as the centrifugal force and these conditions cannot be neutralized excepting by balancing the rollers or the race in correlation of the elements of the bearing.

In the past considerable attention has been devoted to contact of the larger end of the roller with the rib 12 of the cone, in order to give true rolling line contact for tapered rollers, and while this is important it has been found that proper balancing of the rollers is of even more importance because the larger or heavier end of the roller operating naturally in the larger centrifugal area is affected by the natural laws of gravity and force.

It is, therefore, desirable and even necessary that each roller be properly balanced in order that the bearing may perform at maximum capacity.

A fragmentary sectional view of the cone 11 and cup 13 of a tapered roller bearing is illustrated in Fig. 4; a balanced tapered roller 14 being shown interposed in proper position between the cone and cup.

The practice and theoretical consideration of the center of gravity is more than off-set by the fact that the roller race area is a centrifugal area located around the center or axis upon which the bearing rotates.

It is, of course, true that the force at high speed of a race of tapered rollers will tend to force the rollers outward toward the greatest area of the race or against the rib 12 of the cone 11, tending to hold the rollers in true rolling line. But unless the rollers are rotating under speed, the center of gravity is of no importance and is merely a theoretical consideration.

In order to properly balance each roller 14, a substantially conical cavity 15 is formed in the larger or heavier end 16 of the roller, sufficient metal being removed from the cavity so that the larger or heavier end 16 of the roller will weigh exactly the same as the smaller or lighter end 17 thereof after the cavity is formed in the larger end.

It should be apparent that in order to statically and dynamically balance a roller, the size and shape of the balancing cavity will vary in each and every size and angular shape of tapered roller so as to reduce the weight of the heavier or larger end of the roller to exactly the same as the smaller or lighter end thereof.

By so balancing each roller of a race the complete bearing is much better adapted for high speed traffic requirements in automobiles and similar vehicles where high speed operation and quick starts and stops are required; also for railroad rolling stock, powerful high speed industrial machinery and various other equipment.

Keeping in mind the scientific facts as illustrated and explained in relation to Fig. 5, the advantage obtained by balancing the tapered rollers as disclosed herein, produces more powerful, smoother running, safety performance for exceeding the limits of unbalanced tapered rollers.

It should be understood that if desired any usual and ordinary form of cage may be provided for the race of rollers, but since the cage itself forms no part of the invention and does not affect the balanced rollers, no cage is illustrated in the drawing.

I claim:

1. A tapered bearing roller having a cavity in its larger end, said cavity being of such size and shape that each end portion of the roller will be the same weight.

2. A tapered bearing roller having a conical cavity in its larger end, said cavity being of such size and shape that each end portion of the roller will be the same weight.

3. A taper roller bearing including a cone, a tapered cup, and a race of tapered bearing rollers interposed between the cone and cup, each roller having a flared cavity in its larger end, said cavity being of such size and shape that each end of the roller will weigh the same.

OTTO HENSELMAN.